(12) United States Patent
Kyrtsos

(10) Patent No.: US 6,925,755 B1
(45) Date of Patent: Aug. 9, 2005

(54) OBJECT DETECTION BY SIGNAL FIELD MAPPING

(75) Inventor: Christos Kyrtsos, Southfield, MI (US)

(73) Assignee: Meritor Light Vehicle Systems, LLC., Troy, MI (US)

(*) Notice: Subject to any disclaimer, the term of this patent is extended or adjusted under 35 U.S.C. 154(b) by 1355 days.

(21) Appl. No.: 09/628,396

(22) Filed: Aug. 1, 2000

(51) Int. Cl.$^7$ ............................................ E05F 15/02
(52) U.S. Cl. ............................................ 49/26; 49/28
(58) Field of Search ............................ 49/26, 28, 506; 200/61, 43

(56) References Cited

U.S. PATENT DOCUMENTS

| | | | |
|---|---|---|---|
| 4,866,881 A | * | 9/1989 | Morrow et al. ............. 49/28 X |
| 4,894,952 A | * | 1/1990 | Trett et al. ................. 49/27 X |
| 4,914,859 A | * | 4/1990 | Gionet et al. ............... 49/26 X |
| 5,074,073 A | * | 12/1991 | Zwebner ........................ 49/26 |
| 5,463,384 A | | 10/1995 | Juds |
| 5,631,639 A | | 5/1997 | Hibino et al. |
| 5,734,336 A | | 3/1998 | Smithline |
| 5,786,772 A | | 7/1998 | Schofield et al. |
| 5,798,727 A | | 8/1998 | Shirai et al. |
| 5,955,854 A | * | 9/1999 | Zhang et al. ............... 49/28 X |
| 6,154,149 A | | 11/2000 | Tyckowski et al. |

FOREIGN PATENT DOCUMENTS

| | | | |
|---|---|---|---|
| DE | 40 30 607 A | 4/1992 | |
| DE | 4030607 | * 4/1992 | ..................... 49/26 |
| DE | 44 32 112 A | 3/1996 | |
| DE | 195 38 071 A | 4/1997 | |
| EP | 0 617 186 A | 9/1994 | |

OTHER PUBLICATIONS

U.S. Appl. No. 09/391,256, filed Sep. 7, 1999, entitled: Object Detection by Pattern Recognition.
European search report, dated Apr. 30, 2003.

* cited by examiner

*Primary Examiner*—Jerry Redman
(74) *Attorney, Agent, or Firm*—Carlson, Gaskey & Olds

(57) ABSTRACT

An object detection system includes an emitter, a receiver, and a controller adjacent a window assembly which typically includes a moveable glass member and a frame. In operation the emitter transmits the electromagnetic through a defined field adjacent a closure path of a moveable glass member. The controller constructs a map of the signal received by the receiver such that insertion of an object within the defined field produces a variation in the map. The controller halts or reverses the movement of the moveable glass member to prevent trapping the object between the closing moveable glass member and the frame.

20 Claims, 1 Drawing Sheet

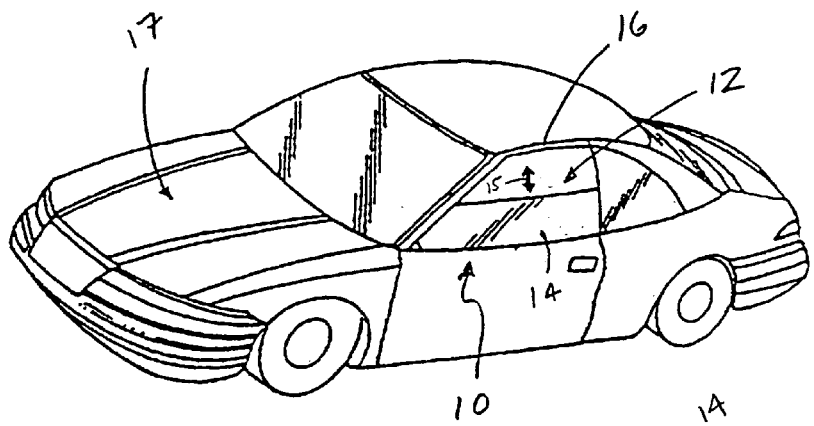
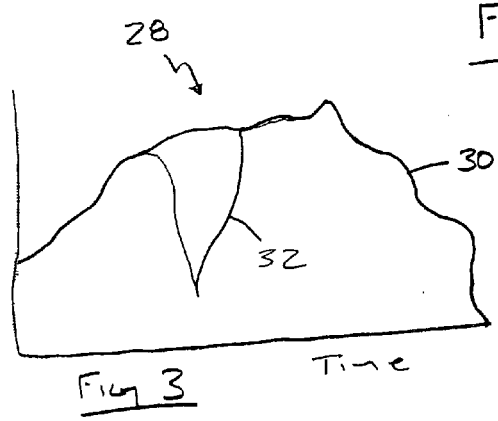
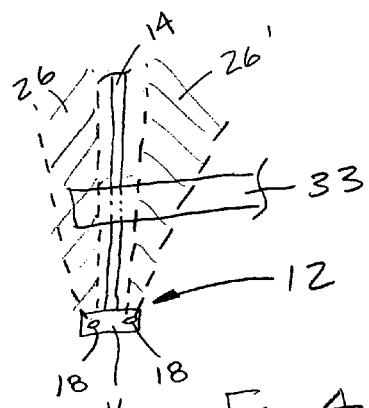
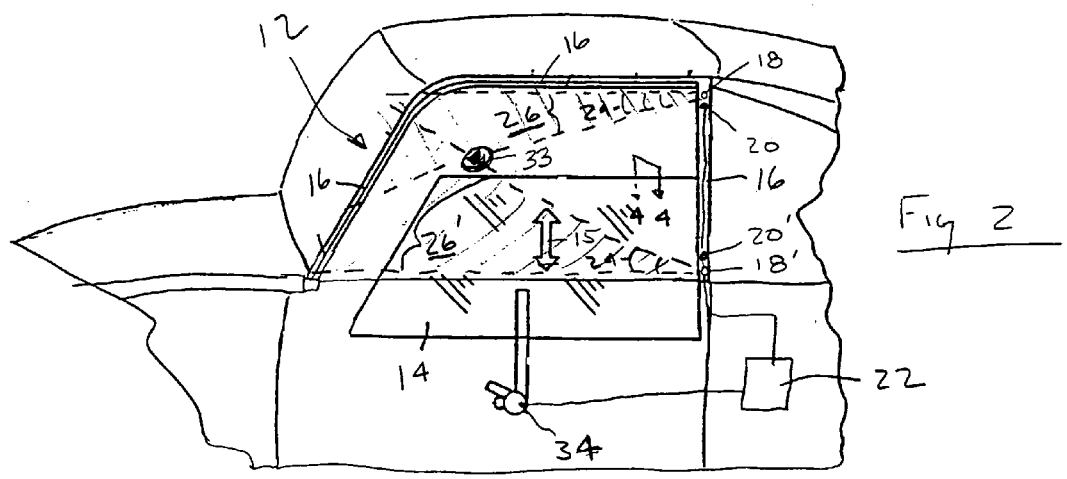

OBJECT DETECTION BY SIGNAL FIELD MAPPING

BACKGROUND OF THE INVENTION

The present invention relates to object detection, and more particularly to an apparatus for detecting an object in the path of a vehicle power window.

Power window mechanisms are commonly known. Recently, one-touch up power windows have been included in vehicles which allow the window to be closed by a single press of the power window operating button. Additionally, such mechanisms are known for vehicle sunroofs and the like. The proliferation of such power window mechanisms has increased the possibility that an object could be captured in the closing window.

Accordingly, it is desirable to provide an object detection system to prevent such possibility of capture. It is further desirable to provide a robust, reliable, lightweight and inexpensive system for vehicle use.

SUMMARY OF THE INVENTION

The object detection system of the present invention generally includes an emitter, a receiver, and a controller attachable to a window assembly that typically includes a moveable closure member and a frame. Although a window is shown and described, the present invention is similarly applicable to a vehicle sunroof/moonroof or other closure members.

In operation the emitter transmits a signal through a defined field adjacent a closure path of a moveable closure member. The controller preferably constructs a "normal" map signature of the received signal which includes the obstructions normally within the defined field. The "normal" map signature is used by the controller as a reference and indicates that no unknown objects are within the defined field.

However, when an unknown object enters within the defined field, a variation from the "normal" map signature is constructed by the controller. The controller compares the varied map signature to the "normal" map signature and identifies the differences. Any difference from the "normal" map signature is identified as an unknown object in the closure path and is an undesirable obstruction.

When an object is determined to be in the defined field, the controller halts or reverses the movement of the moveable glass member to prevent trapping the object between the closing moveable glass member and the frame. Preferably, the emitter is maintained in a dormant state and operated only when the moveable glass member is being closed.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general schematic representation of a vehicle having a moveable window;

FIG. 2 is a general schematic representation of the object detection system according to the present invention;

FIG. 3 is a graphical representation of a mapped signal according to the present invention; and FIG. 4 is a top-down view of the moveable closure member line illustrating an alternate embodiment of the object detection system according to the present invention.

DETAILED DESCRIPTION OF THE PREFERRED EMBODIMENT

FIG. 1 illustrates an object detection system 10 according to the present invention. The system 10 is preferably attachable or integral to a window assembly 12 having a moveable closure member 14. The moveable closure member 14, such as a vehicle window is movable through a closure path (shown schematically by double arrow 15) within a frame 16 typical of a vehicle 17 having a power window, sunroof, or the like.

As shown in FIG. 2, the system 10 generally includes an emitter 18, a receiver 20, and a controller 22 attachable to the window assembly 12. As will be more full described below, the emitter 18 transmits a signal (shown schematically at 24) through a defined field 26 adjacent the closure path 15 of moveable closure member 14. The controller 22 constructs a map of the signal 24 received by the receiver 20 such that insertion of an object (shown schematically at 33) within the defined field produces a variation in the map. The controller 22 can then halt or reverse the movement of the moveable closure member 14 to prevent trapping object 33 between the closing moveable glass member 14 and the frame 16.

The emitter 18 is preferably positioned adjacent the moveable glass member 14 in the frame 16. The receiver 20 is mounted adjacent the moveable glass member 14 in the frame 16 to receive the signal 24 reflection. It is further preferred that a second emitter 18' and receiver 20' are mounted adjacent the moveable closure member 14. The second emitter 18' transmits a second signal (shown schematically at 24') through a second defined field 26' adjacent the closure path 15 of moveable closure member 14.

When an unknown object 33 is determined to be within the defined field 26, the controller 22 halts or reverses the movement of the moveable glass member 14 to prevent trapping the object between the closing moveable closure member 14 and the frame 16. To achieve this control, controller 22 communicates with an actuator 34 for the moveable closure member 14. To conserve power, the emitter 18 can be maintained in a dormant state and operated only when the actuator 34 is operating and the moveable closure member 14 is being closed.

In operation, the emitter 18 transmits the signal 24 within the defined field 26. The signal 24 is preferably an electromagnetic or ultrasonic signal and emitter 18 may transmit the signal 24 continuously or in a pulse to minimize power usage.

The transmitted signal 24 will reflect from obstructions that are always within the defined field 26 such as portions of the frame 16. The receiver 20 will therefore receive a relatively constant reflection which is identified by the controller 22. Whereas the receiver 20 receives a relatively constant signal 24 reflection, the controller 22 constructs a map 28 of the received signal 24 as illustrated in FIG. 3. Mapping algorithms can be provided by signal processing circuitry well known in the art of processing signals and further description of these algorithms will not be discussed. Although operation of only the first emitter 18 and receiver 20 will be described it should be realized that such operation is applicable to the second emitter 18' and receiver 20' and to any number of emitter and receiver combinations.

The "normal" map signature 30 of the received signal 24 including the obstructions normally within the defined field 26 (FIG. 2) is used by the controller 22 as a reference. The "normal" map signature 30 indicates to the controller 22 that no unknown objects are within the defined field 26.

To identify whether an object 33 is within the defined field 26, the controller 22 compares the reflected signal 24 to the "normal" map signature 30, see FIG. 3. If the reflected signal 24 is within a predetermined range of the "normal" map signature 30, then a determination is made that no unknown objects are within the defined field 26.

However, when an unknown object 33 (FIG. 2) enters within the defined field 26, a variation from the "normal" map signature 30 such as varied map signature 32 will be constructed by the controller 22. The controller 22 compares the varied map signature 32 to the "normal" map signature 30 and identifies any differences between the "normal" map signature 30 and the varied map signature 32. The controller 22 thus determines that an unknown object 33 is within the defined field 26 and can stop movement of the moveable closure member 14 as described above.

Controller 22 is programmed to recognize movement of the moveable closure member 14 through the closure path 15. As the moveable glass member 14 moves through the defined field 26 the "normal" map signature 30 can be accordingly adjusted to prevent a false object detection caused by movement of the moveable closure member 14.

In an alternate embodiment of FIG. 4, the defined fields 26, 26' can be set to scan both inside and outside the plane of the moveable closure member 14. The moveable closure member 14 does not move through the defined fields 26, 26' and the "normal" map signature 30 is not adjusted. Any object 33 that is identified in both defined fields 26, 26' both inside and outside the window, is in the closure path 15 and is an undesirable obstruction. Thus, as illustrated in the top view of FIG. 4, if the object 33 is in both defined fields 26, 26', the controller 22 can halt or reverse the movement of the moveable glass member 14.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An object detection system for a vehicle comprising:
   an emitter mounted to transmit a signal within a defined field, said defined field adjacent a closure path of a moveable closure member;
   a receiver to receive said signal as transmitted within said defined field; and
   a controller in communication with said receiver, said controller operable to construct a map signature of said signal received by said receiver, said map signature having a first graphical shape representative of known obstructions normally within said defined field, said first graphical shape representative of said defined field when said defined field is clear of unknown objects, said controller operable to construct a second graphical shape in response to an unknown object entering within said defined field, variation from said first graphical shape indicative of said unknown object.

2. The system as recited in claim 1, wherein said emitter emits an ultrasonic signal.

3. The system as recited in claim 1, wherein said emitter emits an electromagnetic signal.

4. The system as recited in claim 1, wherein said emitter transmits said signal as a pulse.

5. The system as recited in claim 1, wherein said moveable closure member includes a vehicle window.

6. The system as recited in claim 1, wherein said emitter is attached to a vehicle window frame.

7. The system as recited in claim 1, wherein said receiver is attached to a vehicle window frame.

8. The system as recited in claim 1, wherein said emitter transmits said signal only when said closure member is being closed.

9. The system as recited in claim 8, wherein said controller stops movement of said moveable closure member in response to identification of said variation in said defined field.

10. The system as recited in claim 9, wherein said first graphical shape is altered as said moveable closure member moves through said defined field.

11. The system as recited in claim 1, wherein said first graphical shape is altered as said moveable closure member moves through said defined field.

12. A moveable closure assembly comprising:
    a moveable closure member moveable through a closure path;
    an emitter mounted to transmit a signal within a defined field, said defined field adjacent said closure path;
    a receiver to receive said signal as transmitted within said defined field; and
    a controller in communication with said receiver, said controller operable to construct a map signature of said signal received by said receiver, said map signature having a first graphical shape representative of known obstructions normally within said defined field such that insertion of an unknown object within said defined field produces a variation from said first graphical shape.

13. The assembly as recited in claim 12, further comprising an actuator to move said window glass through said closure path.

14. The assembly as recited in claim 13, wherein said controller is in communication with said actuator and said emitter, said emitter transmitting said signal only when said closure member is being moved in a first direction.

15. The assembly as recited in claim 13, wherein said controller is in communication with said actuator and said emitter, said controller operable to stop said actuator in response to identification of said variation in said map.

16. A method of detecting an object in a moveable closure path comprising the steps of:
    (1) transmitting a signal within a defined field, said defined field adjacent a closure path of a moveable closure member;
    (2) receiving said signal as transmitted within said defined field;
    (3) mapping said signal received in said step (2) as a first graphical shape representative of known obstructions normally within said defined field; and (4) identifying a variation in said graphical shape of said step (3).

17. A method as recited in claim 16, further comprising the step of reversing movement of said moveable closure member in response to said variation in said signal.

18. A method as recited in claim 16, wherein said step (1) includes transmitting said signal only when said moveable closure member is being closed.

19. A method as recited in claim 16, wherein said step (1) includes transmitting said signal as a pulse.

20. A method as recited in claim 16, further comprising the step of altering said first graphical shape in response to said moveable closure member moving through said defined field.

* * * * *